No. 874,187. PATENTED DEC. 17, 1907.
H. T. HALLOWELL & H. F. GADE.
SHAFT HANGER.
APPLICATION FILED MAY 17, 1906.
2 SHEETS—SHEET 1.
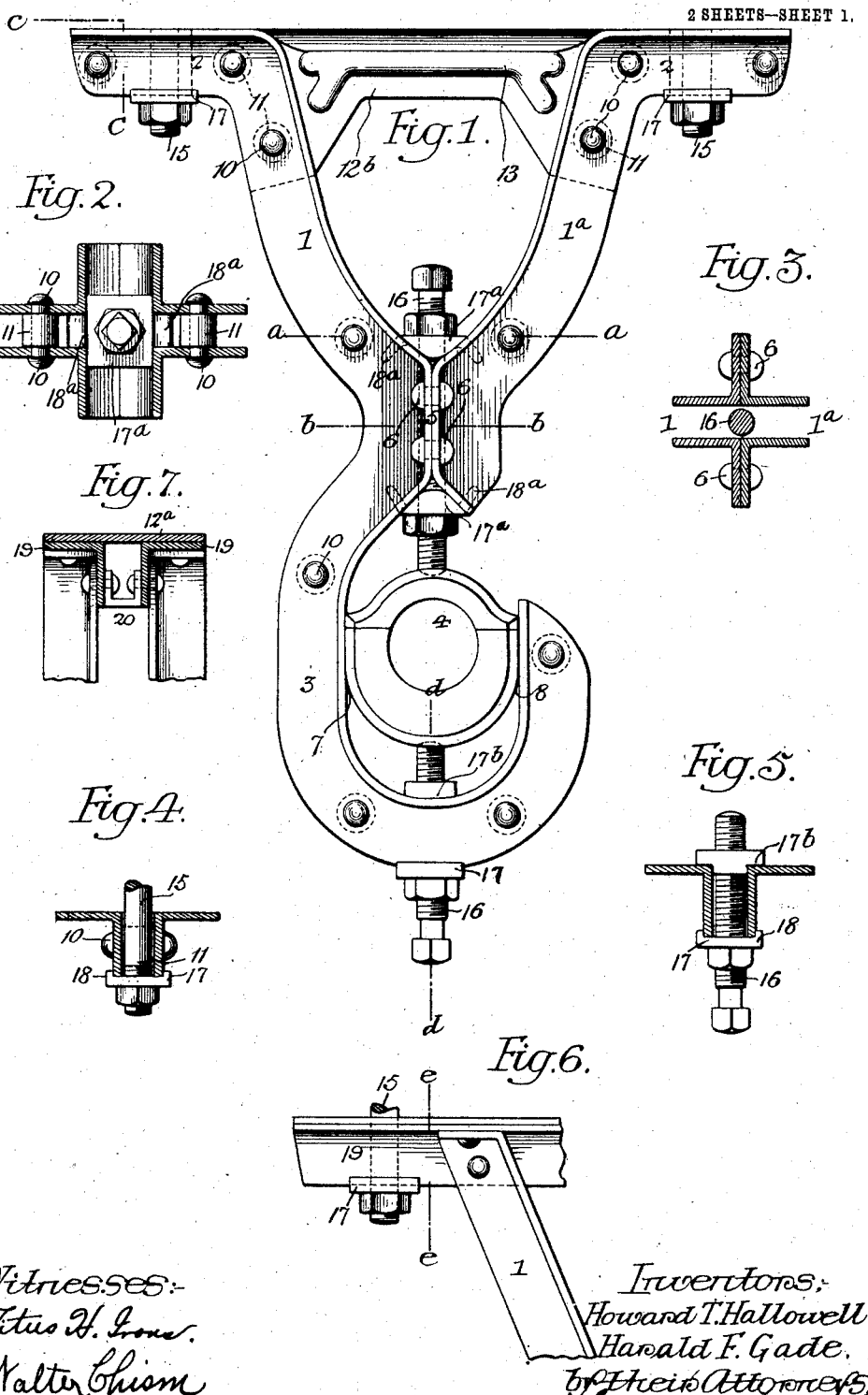
Witnesses:
Titus H. Grove.
Walter Chism
Inventors:
Howard T. Hallowell.
Harald F. Gade.
by their Attorneys
Howson & Howson No. 874,187. PATENTED DEC. 17, 1907.
H. T. HALLOWELL & H. F. GADE.
SHAFT HANGER.
APPLICATION FILED MAY 17, 1906.
2 SHEETS—SHEET 2.
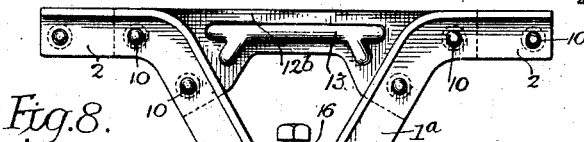
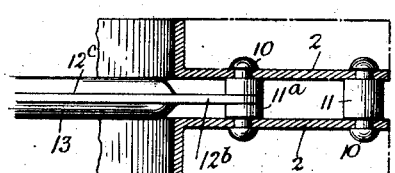
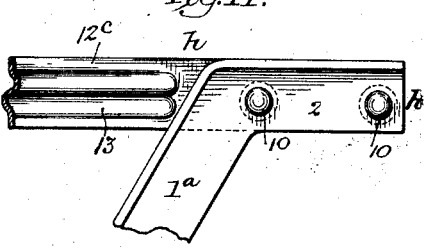
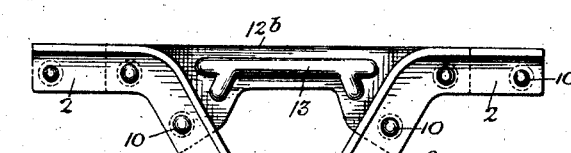
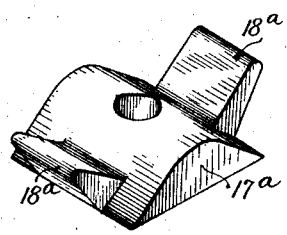
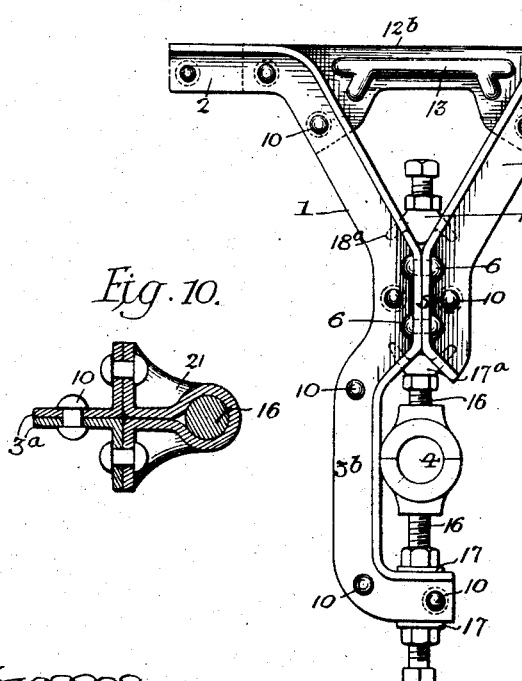
Witnesses
Titus H. Ione
Walter Chism
Inventors,
Howard T. Hallowell.
Harald F. Gade.
by their Attorneys
Howson & Howson
THE NORRIS PETERS CO., WASHINGTON, D. C.

UNITED STATES PATENT OFFICE.

HOWARD T. HALLOWELL AND HARALD F. GADE, OF PHILADELPHIA, PENNSYLVANIA, ASSIGNORS TO STANDARD PRESSED STEEL COMPANY, OF PHILADELPHIA, PENNSYLVANIA, A CORPORATION OF PENNSYLVANIA.

SHAFT-HANGER.

No. 874,187.  Specification of Letters Patent.  Patented Dec. 17, 1907.

Application filed May 17, 1906. Serial No. 317,379.

*To all whom it may concern:*

Be it known that we, HOWARD T. HALLOWELL and HARALD F. GADE, citizens of the United States, and residents of Philadelphia, Pennsylvania, have invented certain Improvements in Shaft-Hangers, of which the following is a specification.

Our invention relates to shaft supporting structures and consists of a novel form of shaft hanger made of metal sections whereby great strength and rigidity are obtained; the object of our invention being to provide a shaft hanger made of the ordinary structural metal of commerce and of relatively few parts, which parts may be readily assembled in a simple, cheap and effective manner.

Our invention is fully shown in the accompanying drawings, in which:

Figure 1, is a view in elevation of a shaft hanger made in accordance with our invention; Fig. 2, is a sectional view of the same, taken on the line $a$—$a$, Fig. 1; Fig. 3, is a sectional view, taken on the line $b$—$b$, Fig. 1; Fig. 4, is a sectional view, taken on the line $c$—$c$, Fig. 1; Fig. 5, is a sectional view, taken on the line $d$—$d$, Fig. 1; Fig. 6, is a view of a portion of a shaft hanger, illustrating a modification of our invention; Fig. 7, is a sectional view of a part of Fig. 6, taken on the line $e$—$e$; Figs. 8 and 9, are views of modified forms of shaft hangers made of sections of structural metal in accordance with our invention; Fig. 10, is a sectional view of a part of Fig. 8, taken on the line $g$—$g$; Fig. 11, is a detached view illustrating a modification of a portion of our invention; Fig. 12, is a sectional view of Fig. 11, taken on the line $h$—$h$, and Fig. 13, is a perspective view of a detail of our invention.

Our invention consists of a shaft hanger made of sections of ordinary structural metal, and may be made of L-, T-, or channel-shaped sections, suitably secured together; the finished hanger comprising two independent parts. One of these parts consists of a leg 1 terminating at one end in a base member 2, and at the other end in a J-shaped portion 3 which is continuous with said leg 1 and supports the usual journal-box 4. The other part of the structure consists of a leg $1^a$ secured to the leg 1, and also terminating in a base member 2. The part comprising the leg 1 and journal support is bent inwardly at the point 5 in line with the vertical center of the journal-box, and the leg $1^a$ is bent to the same degree. These parts are then joined by the rivets 6 forming a symmetrical leg structure. The J-shaped portion 3 continuous with the leg 1 is sprung out from this joint, and the walls 7 and 8 of the part receiving the journal-box are equidistant from the center line of the same. The disposition of the connection of the leg brace $1^a$ centrally with respect to the contour of the hanger provides a stronger structure than the usual form of shaft hangers.

In the present instance each portion of the hanger is made of two sections of structural metal secured together by rivets 10 passing through the flanges of the metal and through washers or collars 11 which also serve as spacing pieces. At the top of the hanger the base members 2 are connected to a plate $12^b$, which may or may not be provided with a corrugated stiffening portion 13, and may be disposed horizontally or vertically as desired. This plate, in the structures shown, is vertically disposed and held by the rivets 10. Bolts 15 are provided for securing the shaft hanger to its support, and bolts 16 for adjusting the vertical journal-box therein. Clips, washers or spacing pieces 17, $17^a$ and $17^b$ are provided for engagement with the structural metal where the bolts are set; said clips having flanges or other parts whereby they may be positioned properly, and through these clips the bolts are passed.

The clips 17 have end flanges 18 engaging the flanges of the sections of structural metal; the clips $17^a$, shown in Figs. 1, 2, 8 and 9, have positioning means in the shape of extensions $18^a$ lying between the sections of structural metal, while the clip $17^b$, shown in Figs. 1 and 5, is internally threaded.

In Figs. 6 and 7, we have shown a modification of the manner in which the legs are secured to the top plate. In this instance the legs are not provided with base members in the sense in which that term is employed in connection with the structure shown in Fig. 1. Sections of structural metal 19 are provided at the base portion extending from leg to leg, with a plate 12ª to which said sections are riveted, and the ends of the legs; a portion being bent over, are riveted to this compound structure. A brace 20 is interposed at the point where the horizontal rivets are placed.

In Figs. 8 and 9, we have shown modified forms of shaft hangers made from structural metal, in which the lower part 3ª supporting the journal-box is not brought around in the manner shown in Fig. 1, but is stopped short directly beneath the journal-box, and while carrying a bolt 16 serving as a support for the under side of the journal box, there is no lateral support for said journal box on one side.

In Fig. 8, the bolt 16 is supported by a cast or pressed member 21 riveted to the lower extension 3ª of the shaft hanger, while in the shaft hanger shown in Fig. 9, said lower extension is indicated at 3ᵇ and is turned around at right angles and the bolt is passed between the two sections or portions of the structural metal. In this structure, washers 17 and 17ª, of the type illustrated with respect to the form of hanger shown in Fig. 1 will be employed.

In the form of hangers shown in Figs. 8 and 9, we also employ a corrugated plate 12ᵇ, vertically disposed, and secured by rivets between the sections of structural metal forming the legs of the hanger. The plate shown in these views as well as that shown in Fig. 1, is held in place in the manner shown in Fig. 12; washers 11ª being interposed between the sections of metal forming the legs and said plates. The plate 12ᵇ shown in Figs. 8 and 9 is corrugated in substantially the same manner as that shown in Fig. 1. The plate 12ᶜ shown in Figs. 11 and 12, however, is corrugated in a slightly different manner, and omits the depending portions at the ends.

Although we have shown and described a shaft hanger made of angle iron bent into the desired shape, it will be understood that channel, T- or other suitably shaped sections of structural metal may be employed in constructing the same.

We claim:

1. A shaft hanger of structural metal bent to shape, comprising a pair of legs each formed of two sections of angle iron, said legs being extended to a common point and there secured, and a J-shaped journal support continuous with one of said legs and springing outwardly from its point of attachment with the other leg and having its supporting portion disposed centrally beneath the connection for said legs.

2. A shaft hanger of structural metal bent to shape, comprising a pair of legs each formed of two sections of angle iron, said legs being extended to a central point and there secured, and a journal-support continuous with one of said legs and springing outwardly from its point of attachment with the other leg and having its supporting portion disposed centrally beneath the connection for said legs.

3. A shaft hanger of structural metal, comprising two sections of similar size bent to shape and suitably secured together, said sections forming a pair of legs, a J-shaped journal-support continuous with one of said legs, and means for connecting said legs together centrally, the shorter leg serving to brace the other.

4. A shaft hanger of structural metal, comprising two sections of similar size bent to shape and suitably secured together, said sections forming a pair of legs, a journal-support continuous with one of said legs, and means for connecting said legs together centrally, the shorter leg serving to brace the other.

5. A shaft hanger of structural metal, comprising two sections of similar size bent to shape and suitably secured together, said sections forming a pair of legs, a J-shaped journal-support continuous with one of said legs, means for connecting said legs together centrally, the shorter leg serving to brace the other, and a plate securing said legs together, the latter having feet continuous with said legs to which said plate is secured.

6. A shaft hanger of structural metal, comprising two sections of similar size bent to shape and suitably secured together, said sections forming a pair of legs, a journal-support continuous with one of said legs, means for connecting said legs together centrally, the shorter leg serving to brace the other, and a plate securing said legs together, the latter having feet continuous with said legs to which said plate is secured.

7. A shaft hanger of structural metal bent to shape, comprising a pair of legs each formed of two sections of angle iron, said legs being extended to a central point and there secured, a journal-support continuous with one of said legs and springing outwardly from its point of attachment with the other leg, and having its supporting portion disposed centrally beneath the connection for said legs, adjustable bolts for holding said journal-box in place, and clips for engaging the structural metal between which said bolts pass.

8. A shaft hanger of structural metal, comprising two sections of similar size bent to shape and suitably secured together, said sections forming a pair of legs, a journal-support carried by said hanger, and a plate having vertical portions disposed between the sections forming said legs and secured thereto.

9. A shaft hanger of structural metal, comprising two sections of similar size bent to shape and suitably secured together, said sections forming a pair of legs, a journal-support carried by said hanger, feet continuous with said legs, a plate having vertical portions disposed between the sections forming said legs and feet, and means for securing said plate thereto.

In testimony whereof, we have signed our names to this specification, in the presence of two subscribing witnesses.

HOWARD T. HALLOWELL.
HARALD F. GADE.

Witnesses:
JOHN D. ULMER,
HARRY D. BROWN, Jr.